Patented Jan. 11, 1944

2,339,041

UNITED STATES PATENT OFFICE 2,339,041

SELF-SET MAGNESIUM CARBONATE COMPOSITION AND METHOD FOR PREPARING THE SAME

Samuel A. Abrahams, Redwood City, Rubin Lewon, Palo Alto, and Louis L. Collonge, San Mateo County, Calif., assignors to Plant Rubber & Asbestos Works, San Francisco, Calif., a corporation of California No Drawing. Application January 21, 1941, Serial No. 375,268

3 Claims. (Cl. 106—286)

Our invention relates to magnesium carbonate compositions, and more particularly to an improved method for enhancing the setting properties of magnesium carbonate prepared to possess self-setting properties and to an improved final product.

As is disclosed in our assignee's United States Patents Nos. 2,209,752, 2,209,753, and 2,209,754, all dated July 30, 1940 a self-setting magnesium carbonate composition adapted for use as a sound or heat insulating material may be prepared from various sources of materials; such as by reaction in an aqueous vehicle of a magnesium compound, such as sea water bittern, with a carbonate salt such as sodium carbonate; by decomposition of an aqueous solution of magnesium bicarbonate; and by gassing with carbon dioxide-containing gas an aqueous vehicle containing a suspension of magnesium hydroxide. In the case where dolomitic material is used as the source of raw material, as is disclosed in Patent No. 2,209,754, the inherent lightness of the final product resulting from the self-setting properties thereof, enables the slurry containing both the calcium carbonate which is insoluble and the self-setting magnesium carbonate crystals to be set as such.

Such self-setting magnesium carbonate exists in the form of very fine, small crystals, and is a normal hydrated magnesium carbonate, believed to be the tri-hydrate. As is pointed out in the patents referred to, it is desirable to obtain relatively small crystals because small crystals have been found to provide greater strength in the final product than that obtainable by larger crystals; and to enhance the formation of relatively fine, small crystals, care must be taken to maintain proper temperature conditions because if the temperature of the reaction vehicle should be too high, the relatively fine, small crystals would be either totally or partially destroyed, resulting in loss or impairment of their self-setting properties. Also, excessive agitation is desirable during formation of the crystals, as it has been found that excessive agitation promotes the formation of the desirable smaller crystals.

The chemistry of magnesium carbonate is quite peculiar inasmuch as it is capable of undergoing many transformations during preparation thereof. Therefore, to obtain the desired relatively fine, small self-settable magnesium carbonate crystals, great care must be observed in the preparation thereof, which is sometimes burdensome in commercial manufacture of such crystals. This is especially so with respect to the preparation of such crystals by decomposition of an aqueous solution of magnesium bicarbonate in the manner disclosed in our assignee's Patent No. 2,209,752. Our invention has as its objects, among others, the provision of a method for promoting with minimum care the formation of the desired relatively small, fine magnesium carbonate crystals, particularly with respect to the decomposition method of Patent No. 2,209,752, and the provision of an improved final product resulting from such method. Other objects of our invention will become apparent from a perusal of the following description thereof.

We have found that uniform formation of the desired relatively fine, self-settable normal magnesium carbonate crystals may be obtained with minimum care by causing precipitation of such crystals in the aqueous reaction vehicle in the presence of any suitable colloidal dispersion of any suitable bentonite clay. The bentonite may be added to the aqueous reaction vehicle either before formation of the self-settable crystalline magnesium carbonate precipitate or just after formation of such precipitate commences, but it is more desirable to add the bentonite prior to the formation of such crystals in order to insure that the major part of such crystalline precipitate occurs in the presence of bentonite so that the bentonite may be readily effective. Except for the addition of the bentonite, the procedures for obtaining such self-settable crystals are the same as those described in the previously mentioned patents, wherein precipitation of such crystals is effected under excessive or vigorous agitation, and the temperature is maintained below the point at which the self-setting properties of such crystals would be destroyed or impaired. With respect to the decomposition method of Patent No. 2,209,752 in which the employment of bentonite is particularly applicable, it is desirable to maintain the temperature close to the highest temperature which may be safely employed without impairing the self-setting properties of the crystals. However, such temperature should not be much over one hundred twenty degrees Fahrenheit (120° F.); although if care is taken, a temperature as high as one hundred forty degrees Fahrenheit (140° F.) may be employed in such decomposition method.

The bentonite insures or promotes formation of the desired relatively fine, small crystals by inhibiting the growth thereof, and causes such crystals to be more uniform in size. Hence, such bentonite materially improves the final product by providing increased strength resulting from the fact that the crystals will all be of the desired relatively fine and small substantially uniform size. This insures against formation of alternate hard and soft spots in the final set product, which might otherwise obtain should the crystals not be all of substantially the same relatively small size when the slurry containing them is subjected to setting conditions.

The character of the colloidal suspension or dispersion of the bentonite is not critical, as any of the well-known colloidal dispersions thereof may be employed, but it is preferred to utilize an aqueous dispersion because of the aqueous character of the reaction vehicles. A suitable well-known dispersion which we have found extremely satisfactory is formed by treating about one (1) part by weight of bentonite with about seventeen (17) parts by weight of hot water at a temperature of about one hundred twenty-five degrees Fahrenheit (125° F.) to two hundred twelve degrees Fahrenheit (212° F.) and thoroughly dispersing the bentonite in the water to form a colloidal suspension. Agitation may be employed to disperse the bentonite but we preferably subject the suspension to a colloidal mill so as to obtain more uniform dispersion. In this connection, it is preferred to treat the aqueous bentonite suspension with any suitable peptizing agent to facilitate the dispersion. Alkalies are generally most frequently employed commercially as peptizing agents for the bentonite. Any suitable alkali will do, but we prefer to utilize sodium carbonate as the peptizing agent, in an amount about one-tenth per cent (0.1%) by weight of the amount of bentonite in the suspension.

The minimum amount of bentonite to be added to the reaction vehicle is not particularly critical but should be sufficient to promote with ease the formation of the desired uniform relatively small, fine magnesium carbonate self-settable crystals. Usually about one half per cent (½%) to about two and one-half per cent (2½%) by weight of bentonite with reference to the calculated amount of normal magnesium carbonate tri-hydrate precipitable in the reaction vehicle, will suffice; and enough of the aqueous bentonite dispersion should be employed to provide the desired amount of bentonite. The maximum amount of bentonite is governed solely by practical considerations, as excessive quantities of bentonite have no adverse effect on the self-setting properties of the magnesium carbonate crystals. We have employed with satisfactory results, as much as five per cent (5%) by weight of bentonite with reference to the calculated amount of magnesium carbonate tri-hydrate precipitable in the reaction vehicle.

However, if quantities of bentonite amounting to more than five per cent (5%) by weight of the calculated amount of magnesium carbonate tri-hydrate are employed, it usually becomes very difficult to filter the resultant slurry because of the colloidal nature thereof imparted to it by the bentonite suspension. Also, the addition of larger quantities of bentonite may be undesirable because of too great an adulteration of the final product. Hence, the upper limit of the amount of bentonite suspension that may be added is determined by these practical factors.

The usual types of reenforcing materials, such as asbestos or other suitable reenforcing fiber, in an amount sufficient to provide a final product which contains from ten per cent (10%) to fifteen per cent (15%) by weight of the fiber may be intermixed with the slurry to be set; such product being generally that employed commercially for heat insulating purposes. Other chemically inactive solid bodies such as vermiculite or diatomaceous earth, may be also mixed in the slurry. Such inert filler or reenforcing fiber may be mixed directly in the slurry after it is formed, or if desired, they may be incorporated in the reaction vehicle in which the self-setting magnesium carbonate crystals are formed.

After the self-settable magnesium carbonate slurry containing the fine crystal promoting bentonite is formed in the reaction vehicle, the procedure for setting the product is preferably that outlined in Patent No. 2,209,754, starting at line 65, column 2, page 2 of the specification thereof, which brings out the steps of preferably preheating the slurry to shorten the time of setting; preferably adding a carbon dioxide-consuming alkali to the slurry to consume carbon dioxide as conversion from the normal to the basic carbonate occurs during the setting and thereby increases the strength of the final product; casting the slurry into a form or mold adapted to shape the composition; effecting the setting independent of application of pressure by applying heat to the slurry in the form while maintaining it in a quiescent state, and simultaneously precluding evaporation of substantial amounts of moisture from the setting slurry to minimize shrinkage; and drying the resultant product. Except for the increased strength which bentonite imparts to the final product, the bentonite will have no adverse effect on the various steps employed for setting the product.

The resultant set basic magnesium carbonate product, even though containing bentonite, possesses all the characteristics outlined in the specification of Patent No. 2,209,754, starting at line 75, column 2, of page 4, namely it is relatively light weight, rigid, and self-supporting. Internally, it is cellular in structure; and it has a chalk-like appearance. When the preferred quantity of bentonite previously outlined is employed and the set, final dried insulating product is made to contain about fifteen per cent (15%) by weight of asbestos fiber, the percentage of bentonite therein is about six-tenths of one per cent (0.6%) to about three per cent (3%) by weight of the final product. Such small quantity will not materially affect the specific gravity values of the products noted in Patent No. 2,209,754.

Employment of the bentonite to produce the results of our invention may be either in a reaction vehicle in which the self-setting precipitate consists essentially of normal hydrated magnesium carbonate crystals alone, or of such crystals intermixed with other materials, such as calcium carbonate which may remain when dolomitic material is employed as the source of raw material. Therefore, in the appended claims, the expression "magnesium carbonate composition" includes compositions, such as the dolomitic composition referred to, which contain materials in addition to magnesium carbonate.

We claim:

1. In the method of producing a self-set magnesium carbonate composition capable of use as a heat insulating material wherein a precipitate of self-settable normal magnesium carbonate crystals is formed in an aqueous reaction vehicle; the step of causing formation of such precipitate in the presence of a colloidal bentonite dispersion to promote relatively small and fine crystals for increasing the strength of the final product.

2. The method of producing a set magnesium carbonate composition which comprises forming in an aqueous reaction vehicle a precipitate of normal magnesium carbonate in the form of crystals having self-setting properties, causing formation of such precipitate in the presence of a colloidal bentonite dispersion to promote relatively small and fine crystals, casting a slurry containing such precipitate and bentonite into a form adapted to provide the shape of the final product, and applying heat to the slurry in the form to enhance setting of such slurry to a firm cake.

3. The method of producing a set magnesium carbonate composition which comprises decomposing magnesium bicarbonate in solution by application of heat and agitation of the solution to provide a precipitate of normal magnesium carbonate in the form of crystals having self-setting properties, causing formation of such precipitate in the presence of a colloidal bentonite dispersion to promote relatively small and fine crystals, casting a slurry containing such precipitate and bentonite into a form adapted to provide the shape of the final product, and applying heat to the slurry in the form to enhance setting of such slurry to a firm cake.

SAMUEL A. ABRAHAMS.
RUBIN LEWON.
LOUIS L. COLLONGE.